United States Patent [19]

Johrde

[11] 4,015,156

[45] Mar. 29, 1977

[54] DYNAMOELECTRIC MACHINE LOCKING WEDGE FOR COIL RETENTION

[75] Inventor: Paul S. Johrde, Franklin Township, Pa.

[73] Assignee: Westinghouse Electric Corporation, Pittsburgh, Pa.

[22] Filed: June 24, 1975

[21] Appl. No.: 589,975

[52] U.S. Cl. .............................................. 310/214
[51] Int. Cl.² ........................................ H02K 3/48
[58] Field of Search ............ 310/214, 215, 114, 51, 310/42, 45, 194

[56] References Cited

UNITED STATES PATENTS

| | | | |
|---|---|---|---|
| 3,139,550 | 6/1964 | Geer | 310/214 |
| 3,740,601 | 6/1973 | Amasino | 310/214 |
| 3,778,891 | 12/1973 | Amasino | 310/214 |

FOREIGN PATENTS OR APPLICATIONS

| | | | |
|---|---|---|---|
| 591,672 | 2/1960 | Canada | 310/214 |
| 627,423 | 2/1938 | Germany | 310/214 |
| 1,140,594 | 1/1969 | United Kingdom | 310/214 |
| 1,022,842 | 3/1966 | United Kingdom | 310/214 |

*Primary Examiner*—R. Skudy
*Attorney, Agent, or Firm*—G. H. Telfer

[57] ABSTRACT

A coil retention system for large dynamoelectric machines with a locking slot wedge of two parts of which one part is T-shaped with the top of the T disposed in the space between adjacent packs of core laminations and the bottom of the T lying in the slot and tapered to a small thickness, the other part of the locking wedge being located in lateral grooves at the slot opening and having a tapered portion that fits over and retains in position the T-shaped part. The locking wedge is used at the ends of the coil slot while intermediate core packs may have conventional slot wedges driven in through lateral grooves. An insulating tape overlies the coil in the slot and wraps around the end of a slot filler and has an extremity locked in place between the locking wedge and the adjacent slot wedge of the next core pack. Cured resinous material bonds together the two parts of the locking wedge and an adhesive on the insulating tape bonds it to the slot filler.

4 Claims, 9 Drawing Figures

U.S. Patent  Mar. 29, 1977  4,015,156
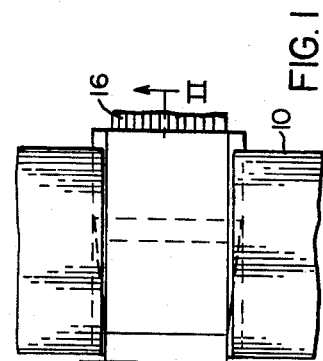
FIG.1
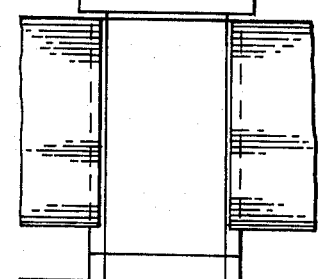
FIG.2
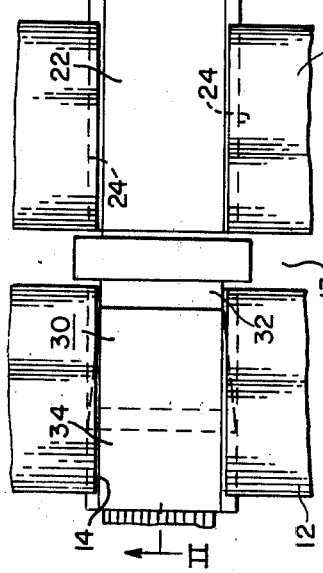
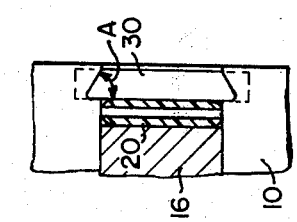
FIG.3
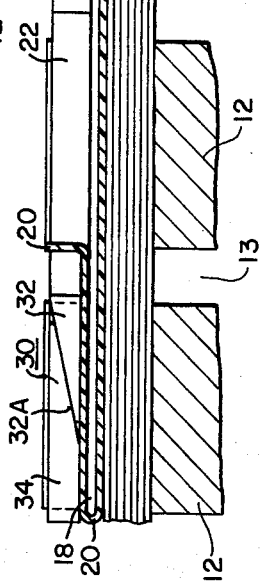
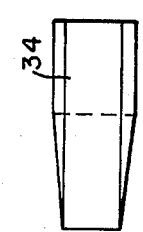
FIG.4
FIG.5
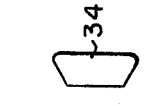
FIG.6
FIG.8
FIG.7

DYNAMOELECTRIC MACHINE LOCKING WEDGE FOR COIL RETENTION

BACKGROUND OF THE INVENTION

This invention relates to dynamoelectric machines and particularly to means for retention of coils in a core thereof.

In relatively large dynamoelectric machines means are required to secure the coils in the stator (sometimes the rotor as well) to avoid excessive vibration. In the past it has been the usual practice to use as coil retaining elements a side filler driven between the coil and the adjacent slot wall, slot fillers above the coil at the slot opening and, over the slot fillers, a slot wedge. The slot wedge is normally configured to be driven in notches or grooves at the opening of the slot to prevent any radial movement of the wedge.

Variously configured wedges have been used or disclosed in the past. Among them is a locking wedge disclosed in U.S. Pat. No. 3,740,601, June 19, 1973 by R. L. Amasino and P. S. Johrde. In accordance with this patent, a slot wedge of relatively rigid insulating material is made to be resilient and compressible at one end, as by providing at that end one or more longitudinal grooves extending a short distance from the end. Also at that end are laterally extending projections to give the slot wedge a normal dimension, when uncompressed, that is oversized in relation to the core slot dimension. Upon compression of this end of the slot wedge, the wedge can be inserted in the slot and driven through the first pack of laminations. When the compressed end of the slot wedge emerges from the first pack it expands to normal size with the projections locking into the first vent duct in the core. This effectively retains the slot wedges in place. The referred to patent also discloses use of a flexible strip of material on the outside coil surface over which one or more slot fillers are placed with the tape folded over the ends of the slot fillers and fixed in place by being held between the referred to locking wedge and the adjacent slot wedge of an interior core pack. This arrangement has been successfully employed, but difficulty remains in providing the locking wedge with sufficient resiliency so that it can be readily driven into the core pack and still securely retain the coils and other elements. The grooves or slots providing the resiliency of the oversized end may also weaken the assembly.

SUMMARY OF THE INVENTION

In accordance with the present invention, a coil retention system for large dynamoelectric machines is provided that includes a locking slot wedge of two parts. One part of the locking wedge is T-shaped with the top of the T disposed in the space between adjacent packs of core laminations and the bottom of the T lying in the slot and tapered to a small thickness. The other part of the locking wedge is located in lateral grooves at the slot opening and has a tapered portion that fits over and retains in position the T-shaped part. The locking wedge is used at the ends of the coil slot while intermediate core packs may have conventional slot wedges driven in through lateral grooves. An insulating tape overlies the coil in the slot and wraps around the end of a slot filler and has an extremity locked in place between the locking wedge and the adjacent slot wedge of the next core pack. Cured resinous material bonds together the two parts of the locking wedge and an adhesive on the insulating tape bonds it to the slot filler.

As opposed to the system of U.S. Pat. No. 3,740,601, the present invention provides a locking wedge that does not require any difficult assembly operation. The enlarged portion of the locking wedge need not be driven through the slot, but is merely placed in the space between the adjacent core packs. The leg of the T-shaped part runs along the slot without frictional engagement in notches. The second part of the locking wedge is held in slot grooves and overlies a principal portion of the first part of the locking wedge. In this way, permanent assembly is achieved while minimizing the difficulty of assembly. The invention permits thicker (¼ inch or more) wedges and results in a stronger assembly. Greater strength is provided by the locking wedge of the present invention because it is not weakened by the slots required for the resiliency of the wedge of the prior patent.

BRIEF DESCRIPTION OF THE DRAWING

FIG. 1 is a partial view of the interior of a dynamoelectric machine stator embodying the present invention;

FIG. 2 is a partial sectional view taken along line II-II of FIG. 1;

FIG. 3 is an end elevation view of the structure of FIG. 1;

FIGS. 4 and 5 are, respectively, plan and side elevation views, respectively, of a first part of the locking wedge used in the embodiment of previous figures; and, FIGS. 6, 7 and 8 are, respectively, plan, side elevation, and end elevation views of a second part of the locking wedge employed in the embodiment of the previous figures.

DESCRIPTION OF THE PREFERRED EMBODIMENT

Referring to FIGS. 1 to 3, the invention is shown embodied in a dynamoelectric machine having a stator core 10 that comprises a plurality of packs 12 of metallic laminations with ventilating ducts 13 between adjacent packs. Coil slots 14, of which only one is shown, extend longitudinally through the core for the disposition of coils 16 therein. The core 10 normally has the general configuration of a hollow cylinder of which only a small part is shown in the drawing. The invention is particularly described and applicable to the construction of stators of relatively large machines, such as turbine generators, and has found particular application in vertically disposed hydrogenerators. Vertical machines tend to present more frequent problems in retaining elements in the slots than do horizontal machines. However, the invention is not so limited and may be applied to stators of either horizontal or vertical disposition and may also be applied to rotor windings.

The coils 16 each comprise a plurality of conductors with an insulating covering. Elements called side fillers (not shown) are normally disposed on one or both sides of the coils 16 to secure the coils from lateral movement in the slot 14. Securing of the coils 16 in the radial direction is effected by one or more slot fillers 18 disposed over the coils and by slot wedges that are positioned to fix their radial location in notches or grooves in the walls of the slot.

After the coils 16 and any side fillers are placed in the slot 14, there is first applied to the insulative surface of the coil a layer 20 of flexible insulating material, such as a strip of glass fiber banding tape, of a length which is greater than the slot length. Over the flexible strip is disposed one or more relatively more rigid insulating slot filler members 18, of which one is shown for convenience. Interior wedges 22, which may be of conventional configuration, are driven through notches 24 into the interior core packs. After location of a sufficient number of interior slot wedges, the flexible strip 20 is wrapped around the ends of the filler strips and back to the outer ends of the interior wedges. Locking wedges 30 are then applied, one at each end of the stack.

The locking wedge 30 in accordance with this invention comprises a first part 32, also shown in FIGS. 4 and 5, that is a flat element of a T-shaped configuration with the bottom of the T being tapered to a small thickness. It is placed in the slot so that the top of the T is in the space 13 between the adjacent core packs. The top of the T is of greater width than the maximum slot width including the notches 24. The bottom of the T is, however, of lesser width than the slot itself so that this part of the wedge need not be driven through the notches at all but is merely laid in place.

The second part of the locking wedge 34, also shown in FIGS. 6, 7 and 8, is driven in through the notches 24 and has a tapered end portion that rides up over the tapered portion of the first part 32 of the locking wedge so that when the second part is driven into place, as shown in FIGS. 1 and 2, the first part is restrained from any radial movement.

The second part 34 of the locking wedge is driven in until the head of the first part of the locking wedge is securely driven against the end of tape 20 and the slot wedge 22 of the interior core pack.

For firm retention of the locking wedge 30, it is preferred to apply a curable resinous bonding material, such as epoxy resin, to the tapered surface 32A of the first part 32 of the wedge and also on the interior surfaces of the notches 24 so that the second part 34 of the locking wedge is intimately secured by this bonding material, both to the first part of the wedge and to the slot material, upon curing.

Additionally, it is preferred that the tape 20 have an adhesive on a single surface thereof, that being the surface which is adjacent to the filler strip 18 so that when the elements are assembled, the tape is fixed in place against the filler strip as well as against the end surface of the slot wedge in the interior core pack. It is not preferred to employ an adhesive on both sides of the tape because of difficulty it would cause in getting the driven part 34 of the locking wedge into the desired place and because it would restrict longitudinal movement of the coil with respect to the core and wedges.

The locking wedge arrangement of this invention is particularly preferred over that of U.S. Pat. No. 3,740,601 where it is possible that the wedges have a total thickness of ¼ inch or more and where the radial force exerted by the coil on the wedge is relatively large.

I claim:

1. A dynamoelectric machine comprising:
    a core including a plurality of spaced packs of metallic laminations;
    a slot in said core;
    a coil in said slot;
    means for securing said coil in said slot including a flexible insulating tape on said coil, a slot filler of insulating material disposed on said tape, a first slot wedge over said slot filler and engaged within lateral grooves in a first of said plurality of spaced packs of metallic laminations that is in the interior of said core, said first pack being adjacent a second of said plurality of packs that is on the exterior of said core, a two-part locking slot wedge disposed over said slot filler and said tape in the slot of said second pack, said tape being folded back on said filler and continuing along said filler with an extremity of said tape extending between said first slot wedge and said locking slot wedge;
    said locking slot wedge comprising a first part of a generally T configuration with the top of the T in the space between said first and second packs and the bottom of the T within said slot of said second pack, said first part being tapered from the top of the T over a substantial portion of its length with decreasing thickness to the bottom of the T, said locking slot wedge also comprising a second part with a taper similar to that of said first part, said second part being frictionally fit within lateral grooves in said second pack and fitting over said tapered portion of said first part, said first part of said locking slot wedge being spaced from said lateral grooves.

2. A dynamoelectric machine as in claim 1, further comprising: an adhesive material on the side of said tape adjacent each side of said slot filler.

3. A dynamoelectric machine as in claim 1 further comprising: a cured resinous material bonding said tapered surfaces of said parts of said locking wedge.

4. A dynamoelectric machine as in claim 1 wherein: said core comprises a plurality of slots containing coils and said coils are retained in each of said slots by means including one of said locking slot wedges at each end of said slots.

* * * * *